W. M. WHITE.
ENERGY TRANSLATING DEVICE.
APPLICATION FILED SEPT. 5, 1918.

1,383,361.

Patented July 5, 1921.

Inventor
W. M. White
by
Attorney

UNITED STATES PATENT OFFICE.

WILLIAM MONROE WHITE, OF MILWAUKEE, WISCONSIN.

ENERGY-TRANSLATING DEVICE.

1,383,361.  Specification of Letters Patent.  Patented July 5, 1921.

Application filed September 5, 1918. Serial No. 253,110.

*To all whom it may concern:*

Be it known that WILLIAM MONROE WHITE, a citizen of the United States, residing at Milwaukee, in the county of Milwaukee and State of Wisconsin, has invented a certain new and useful Improvement in Energy-Translating Devices, of which the following is a specification.

This invention relates in general to improvements in the construction and operation of energy translating machinery, and relates specifically to improvements in brake structure and means for facilitating ventilation of such structure and of inspection passages associated with energy translating installations.

An object of the invention is to provide a simple and efficient brake especially applicable to rotatable parts of energy translating devices. Another object of the invention is to provide simple and efficient means for ventilating brake structures, inspection passages and other elements associated with energy translating installations.

One of the more specific objects is to provide simple and efficient means for supporting a rotor brake. Another specific object is to provide improved means for facilitating ventilation of a brake structure. A further specific object is to provide simple and efficient means for supplying fresh air to and for preventing heated air from entering inspection passages adjoining energy translating machinery. Still another specific object is to provide various improved details of construction whereby the efficiency of energy translating machinery is increased to a maximum.

In energy translating installations and especially in hydro-electric installations of the vertical, direct-connected type comprising a turbine, a generator located above the turbine, a vertical main shaft connecting the turbine and the generator, and an inspection pit surrounding the main shaft, it has heretofore been customary to provide a brake for the rotatable turbine and generator elements, this brake ordinarily being located in proximity to the inspection pit and being associable with the generator rotor. It is usual to support this brake upon several segregated brackets which are attached directly to the wall of the inspection pit, this wall ordinarily being of annular form and being designated as the pit ring. No special means for ventilating the brake or for preventing the flow of heated air from the generator into the pit, are provided in these prior art structures.

While the structure of the prior art above referred to is reasonably satisfactory when applied to relatively small installations, it has been found that in larger installations there are several objections to the prior art structure. In the first place it has been found that the size of the individual brackets necessary to support the brake, become so great that they interfere with the inspection passage and the pit ring is in many cases of insufficient strength to support the enormous weight of these brackets and the elements associated therewith. Secondly, it has been found necessary to provide some positive means for ventilating the brake structure and for preventing the heated air emitted by the generator from entering the inspection pit.

The present invention contemplates elimination of these defects of the prior art devices and has for its object the provision of a relatively light but strong brake support which will not interfere with the accessibility of the inspection pit, combined with means for effectively automatically ventilating the brake structure, means for preventing heated air from entering the inspection pit from the generator and means for supplying fresh air to the inspection pit.

A clear conception of an embodiment of the invention may be had by referring to the drawing accompanying and forming a part of this specification, in which like reference characters designate the same or similar parts in the several views.

While the invention has been illustrated as specifically applied to a vertical, direct-connected hydro-electric installation, it is not intended to limit the scope thereof by such disclosure. It will be apparent that the various features of the invention may be applied to other types of installations in like manner to produce the desirable results.

Figure 1:
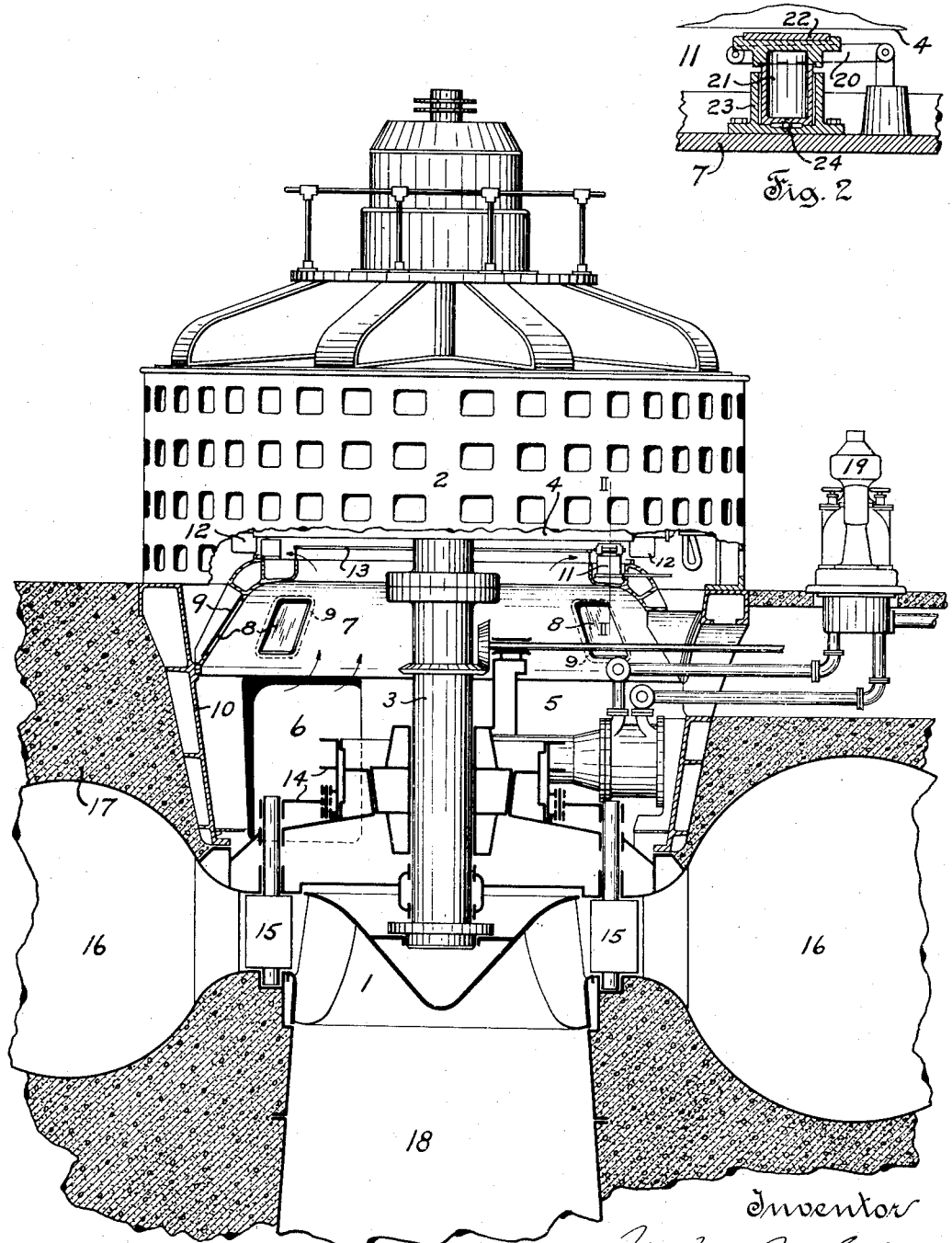
Figure 1 is a somewhat diagrammatic central vertical section through a hydro-electric power installation of the vertical, direct-connected type.

The hydro-electric installation illustrated in Fig. 1 of the drawing comprises generally an energy translating device or Francis turbine runner 1, an energy absorbing device or electric generator 2 having a rotor 4, and a vertical main shaft 3 direct connecting the turbine and generator rotors. The turbine and generator are spaced apart vertically to provide an inspection pit 5 which surrounds the shaft 3 and is lined with a downwardly converging conical pit ring 10. The pit ring 10 has its lower extremity resting directly upon the speed ring of the hydraulic turbine, while its upper extremity is provided with a surface which engages a lower surface of the generator frame. The ring 10 is preferably provided with outer ribs which are embedded directly in the concrete foundation 17, and carries practically the entire weight of the electric generator 2.

The Francis turbine 1 is of ordinary construction being provided with a spiral inlet casing 16, an annular series of governor controlled movable guide vanes 15 for controlling the flow of fluid from the casing 16 to the rotor 1, and a draft tube 18 connecting the rotor 1 with the tailrace. The movable guide vanes 15 are manipulatable by means of mechanism 14 which is controllable by a speed governor 19 of usual construction.

Figure 2:
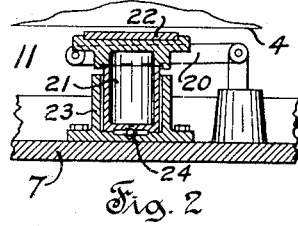
Fig. 2 is an enlarged fragmentary central vertical section through one of the fluid pressure actuated brake elements, the section being taken along the line II—II of Fig. 1.

The brake for the rotating parts of the installation is of the fluid pressure actuated type, comprising a series, usually three or more, of brake shoes 22 carried by plungers or pistons 21 which are reciprocable within cylinders 23, see Fig. 2. The cylinders 23 are supported upon an upwardly converging frusto-conical ring 7 which is secured to and is supported directly by the pit ring 10. Each of the cylinders 23 is provided with a fluid inlet and discharge conduit 24, these conduits communicating with a suitable source of controllable fluid pressure, not shown. The brake shoes 22 are connected with links 20 which are pivoted to fixed projections upon the ring 7, and serve to retain the shoes 22 in position upon the ends of the pistons 21. The connection between the shoes 22 and the pistons 21 is such that slight relative transverse displacement of these elements is permitted, such relative movement being produced by the swinging of the links 20 about their stationary pivots. The brake shoes 22 are adapted to directly frictionally engage a lower surface of the generator rotor 4, to thereby retard the speed of the rotor. The rotor 4 is provided with a series of fan vanes 12 adjacent the brake shoes 22, these vanes 12 serving to produce an outward flow of air around the shoes 22 and adjacent to the braking surface of the rotor 4.

The frusto-conical ring 7 is provided with a series of openings 8 which are normally closed by means of plates 9 and which permit inspection of the interior of the generator 2. The central portion of the ring 7 is provided with a guard plate 13 preferably formed as a perforated plate or screen, which serves to prevent injury of a person in the pit 5 by coming in contact with rotor elements. The inspection pit 5 is provided with one or more air ducts 6 for permitting access to the pit and for admitting fresh air to the pit 5 and to the generator 2 past the upper edge of the ring 7.

During normal operation of the machine, the guide vanes 15 are adjusted so as to admit water from the casing 16 to the turbine rotor 1 from which the water is delivered to the tailrace through the draft tube 18. Adjustment of the guide vanes 15 is effected by the governor 19 or manually, through the controlling mechanism 14. As the water passes the rotor 1 and imparts rotary movement thereto, the generator rotor 4 is caused to rotate through the intermediary of the main shaft 3. Upon rotation of the rotor 4, the fan blades 12 associated therewith, produce a forced flow of air through the generator 2, this air being drawn through the air ducts 6, pit 5 and past the brake shoes 22 as indicated by the arrows. In this manner a fresh supply of air is continuously drawn into and through the pit 5 and delivered past the brake to the generator 2. The annular brake support or ring 7 positively prevents heated air from the generator 2 from returning to the pit 5.

It will be further noted that the continuous ring 7 forms a rigid and comparatively light support for the brake structure, permitting ready alinement of the brake shoes with the co-actable lower surface of the rotor 4, and in no manner interferes with the accessibility of the pit 5. The openings 8 permit ready inspection of the interior of the generator and the plates 9 normally covering these openings effectively cut off the return of air from the generator to the pit. The inspection pit 5 is continuously supplied with fresh cool air during operation of the generator 2, and danger of injury of occupants of the pit is eliminated by the guard screen 13.

It should be understood that it is not desired to limit the invention to the exact details herein shown and described for various modifications within the scope of the appended claims may occur to persons skilled in the art.

It is claimed and desired to secure by Letters Patent:

1. In combination, an energy translating device, an energy absorbing device located above said translating device, means direct connecting said devices, means forming an inspection pit adjacent to said connecting means, and means coöperating with said absorbing device to prevent transition of air from said absorbing device to said pit during operation of said devices.

2. In combination, a hydraulic turbine, an electric generator located above said turbine, a vertical shaft direct connecting said turbine and said generator, means forming an inspection pit between said turbine and said generator and adjacent to said shaft, and baffle means coöperating with said generator to prevent transition of air from said generator to said pit during operation of said generator.

3. In combination, a hydraulic turbine, an electric generator located above said turbine, a vertical shaft direct connecting said turbine and said generator, means forming an inspection pit between said turbine and said generator and adjacent to said shaft, means for admitting air to said pit, means located between said generator and said pit for withdrawing air from said pit and for forcing said air through said generator, and means for preventing transition of air from said generator to said pit during operation of said generator.

4. In combination, an energy translating device, an energy absorbing device associated with said translating device, means forming an inspection pit adjacent to said devices, a brake for said devices, and a brake support coöperating with said absorbing device to prevent transition of air from one of said devices to said pit during operation of said devices.

5. In combination, an energy translating device, an energy absorbing device located above said translating device, means direct connecting said devices, a brake for said devices, means forming an inspection pit adjacent to said connecting means and to said brake, and a brake support coöperating with said absorbing device to prevent transition of air from said absorbing device to said pit during operation of said devices.

6. In combination, a hydraulic turbine, an electric generator located above said turbine, a vertical shaft direct connecting said turbine and said generator, a brake associated with said generator, means forming an inspection pit adjacent to said shaft and to said brake, and a brake support coöperating with said generator to prevent transition of air from said generator to said pit during operation of said generator.

7. In combination, a hydraulic turbine, an electric generator located above said turbine, a vertical shaft direct connecting said turbine and said generator, a brake for said generator, means forming an inspection pit between said turbine and said generator and adjacent to said shaft and to said brake, means for admitting air to said pit, a brake support forming a baffle between said pit and said generator, and means for withdrawing air from said pit past said brake and for forcing said air through said generator.

8. In combination, an energy translating device, an energy absorbing device associated with said translating device, a brake for said devices, said brake comprising a plurality of braking elements coactable directly with one of said devices, an upright wall forming an inspection pit between said devices, and a single brake support secured to said wall and extending laterally therefrom to sustain all of said brake elements.

9. In combination, an energy translating device, an energy absorbing device associated with said translating device, an upright wall forming an inspection pit adjacent to said devices, a brake for said devices, and a single annular brake support secured to said pit forming wall at a plurality of places.

10. In combination, an energy translating device, an energy absorbing device associated with said translating device, means forming an inspection pit adjacent to said devices, a brake for said devices, and a brake support forming a conduit for directing air from said pit toward the braking surfaces of said brake.

11. In combination, an energy translating device, an energy absorbing device associated with said translating device, means forming an inspection pit adjacent to said devices, a brake associated with one of said devices, and a continuous brake support associated with said pit forming means and coöperating with said absorbing device to prevent transition of air from said absorbing device to said pit during operation of said devices.

12. In combination, an energy translating device, an energy absorbing device, a vertical shaft direct connecting said devices, means forming an inspection pit surrounding said shaft, a brake for the upper of said devices, and a single brake support secured to said pit forming means at a plurality of places spaced about said shaft.

13. In combination, a turbine, a generator, a vertical shaft direct connecting said turbine and said generator, means supported by the stator of said generator, a brake for the rotor of said generator, and a single brake support surrounding said shaft and associated with said means.

14. In combination, a turbine, a generator located above said turbine, a shaft direct connecting said turbine and said generator, a downwardly extending wall associated with the stator of said generator, a brake associated with the rotor of said generator, and an upwardly converging ring associated with said wall and forming a support for said brake.

15. In combination, a turbine, a generator located above said turbine, a vertical shaft direct connecting said turbine and said generator, a wall forming an inspection pit between said turbine and said generator and surrounding said shaft, a brake associated with said generator, a single annular brake support secured to said wall and coöperating with said generator to prevent transition of air from said generator to said pit during operation of said generator, and means for producing a flow of air adjacent to said brake and into said generator.

16. In combination, a hydraulic turbine, an electric generator located above said turbine, a vertical shaft direct connecting said turbine and said generator, a brake for said generator, means forming an inspection pit between said turbine and said generator and adjacent to said shaft and to said brake, means for admitting air to said pit, a brake support forming a baffle between said pit and said generator, and means for withdrawing air from said pit and for urging said air past said brake to said generator.

17. In combination, an energy translating device, an energy absorbing device, a vertical shaft direct connecting said devices, a downwardly extending annular wall associated with the upper of said devices, a brake associated with the rotor of said upper device, and an upwardly extending annular element associated with said wall and forming a support for said brake.

18. In combination, an energy translating device, an energy absorbing device located above said energy translating device, a shaft direct connecting said devices, a downwardly extending wall associated with said energy absorbing device, a brake associated with the rotor of said energy absorbing device, and an upwardly extending continuous member associated with said wall and forming a support for said brake.

19. In combination, an energy translating device, an energy absorbing device located above said translating device, a vertical shaft direct connecting said devices, a downwardly converging wall associated with said absorbing device, a plurality of brake elements associated with the rotor of said absorbing device, and an upwardly converging wall associated with said downwardly converging wall and forming a unitary support for said brake elements.

20. In combination, an energy translating device, an energy absorbing device, a shaft direct connecting said devices, a wall extending away from one of said devices and forming an inspection pit surrounding said shaft, a brake associated with one of said devices, and a continuous element secured to said wall and forming a support for said brake.

21. In combination, a turbine, a generator located above said turbine, a vertical shaft direct connecting said turbine and said generator, a downwardly converging wall associated with the stator of said generator and forming an inspection pit surrounding said shaft, a brake associated with the rotor of said generator, and an upwardly converging annular member associated with said wall and forming a support for said brake.

22. In combination, a hydraulic turbine, an electric generator located above said turbine, a vertical shaft direct connecting said turbine and said generator, means forming an inspection pit between said turbine and said generator and adjacent to said shaft, means for admitting air to said pit, and a fan associated with the rotor of said generator and located between said generator and said pit for withdrawing air from said pit and for forcing said air through said generator.

In testimony whereof, the signature of the inventor is affixed hereto.

WILLIAM MONROE WHITE.